(12) United States Patent
Miyazaki

(10) Patent No.: US 6,181,523 B1
(45) Date of Patent: Jan. 30, 2001

(54) HEAD CARRIAGE ASSEMBLY FOR A MAGNETIC DISK DRIVE

(75) Inventor: Makoto Miyazaki, Gunma (JP)

(73) Assignee: NEC Corporation, Tokyo (JP)

(*) Notice: Under 35 U.S.C. 154(b), the term of this patent shall be extended for 0 days.

(21) Appl. No.: 08/424,634

(22) Filed: Apr. 19, 1995

(30) Foreign Application Priority Data

Apr. 20, 1994 (JP) .................................... 6-081229

(51) Int. Cl.[7] .................................................. G11R 21/16
(52) U.S. Cl. ....................................................... 360/245.5
(58) Field of Search ................................... 360/103, 104

(56) References Cited

U.S. PATENT DOCUMENTS

| 4,998,174 | * | 3/1991 | Wada et al. ......................... | 360/103 |
| 5,091,810 | * | 2/1992 | Kakizaki et al. .................... | 360/103 |
| 5,325,250 | * | 6/1994 | Nagase ................................. | 360/104 |
| 5,434,731 | * | 7/1995 | Hagen .................................. | 360/104 |

FOREIGN PATENT DOCUMENTS

| 61-153868 | 7/1986 | (JP) . |
| 62-229579 | 10/1987 | (JP) . |
| 4-149816 | * 5/1992 | (JP) . |
| 4-278214 | 10/1992 | (JP) . |
| 5-12613 | * 1/1993 | (JP) . |

\* cited by examiner

*Primary Examiner*—Sara Crane
(74) *Attorney, Agent, or Firm*—Young & Thompson

(57) ABSTRACT

In a magnetic disk drive, a head carriage assembly includes a slider which is directly adhered to a carriage. The assembly, therefore, needs a minimum of constituent parts and a minimum of assembling steps. The absence of a conventional metal plate reduces the thickness of the assembly and, therefore, the overall thickness of the disk drive. The weight of the assembly is reduced in the front part of the carriage. This successfully reduces a period of time necessary for an overshoot and vibration occurring during seek due to a drive motor to attenuate, thereby reducing the reading time and writing time.

4 Claims, 4 Drawing Sheets

HEAD CARRIAGE ASSEMBLY FOR A MAGNETIC DISK DRIVE

BACKGROUND OF THE INVENTION

1. Field of the Invention

The present invention relates to a head carriage assembly for a magnetic disk drive for writing and reading data out of a flexible magnetic disk and, more particularly, to a head carriage assembly for a floppy disk drive.

2. Description of the Related Art

A magnetic disk drive is built in a computer, word processor or similar data processing apparatus and used to write and read data out of a flexible magnetic disk, e.g., floppy disk. The disk drive includes a magnetic head unit implemented as a head carriage assembly which has customarily been made up of a slider, a metal plate, and a carriage. The slider has a magnetic core and a pair of slider elements sandwiching the core. The slider is affixed to the metal plate by adhesive while the metal plate is affixed to the carriage by adhesive.

However, the conventional head carriage assembly has a problem that it needs at least three members, i.e., slider, metal plate and carriage and, therefore, a number of assembling steps. Another problem is that such the three members each has a substantial thickness, increasing the overall size of the disk drive. In addition, a period of time necessary for an overshoot and vibration particular to tracking to be attenuate increases due to the weight of the three members.

SUMMARY OF THE INVENTION

It is, therefore, an object of the present invention to provide a head carriage assembly for a magnetic disk drive and needing a minimum of constituent parts to thereby reduce the number of assembling steps and production cost.

A head carriage assembly for a magnetic disk drive of the present invention has a slider including a magnetic core for writing and reading data out of a magnetic disk, and a carriage supporting the slider. The slider is directly adhered to the carriage.

BRIEF DESCRIPTION OF THE DRAWINGS

The above and other objects, features and advantages of the present invention will become apparent from the following detailed description taken with the accompanying drawings in which.

DESCRIPTION OF THE PREFERRED EMBODIMENTS

Figure 1:
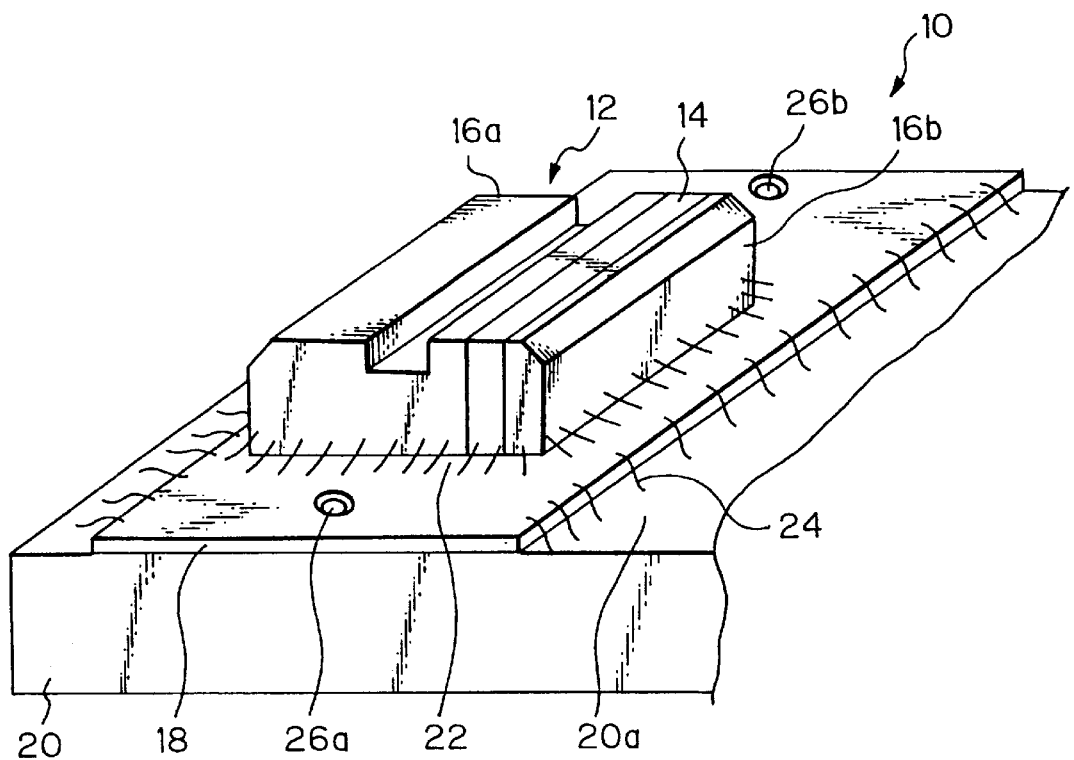
FIGS. 1–5 show some conventional head carriage assemblies.

To better understand the present invention, a brief reference will be made to a conventional head carriage assembly for a magnetic disk drive, shown in FIG. 1. As shown, the assembly, generally 10, has a slider 12 made up of a magnetic core 14 and a pair of slider elements 16a and 16b sandwiching the core 14. The slider 12 is affixed to a plate 18 made of metal (SUS) and mounted on a carriage 20 which is constituted by a molding. The slider 12 is affixed to the metal plate 18 by adhesive 22 while the plate 18 is affixed to the upper surface 20a of the molding 20 by adhesive 24. Positioning holes 26a and 26b are formed in the metal plate 18 in order to position the R/W (Read/Write) gap of the core 14. After the slider 12 has been positioned by use of the holes 26a and 26b, the metal plate 18 is adhered to the carriage 20. The conventional assembly 10, therefore, needs at least three members, i.e., slider 12, metal plate 28, and carriage 20. This brings about the various problems as discussed earlier.

Figure 2:
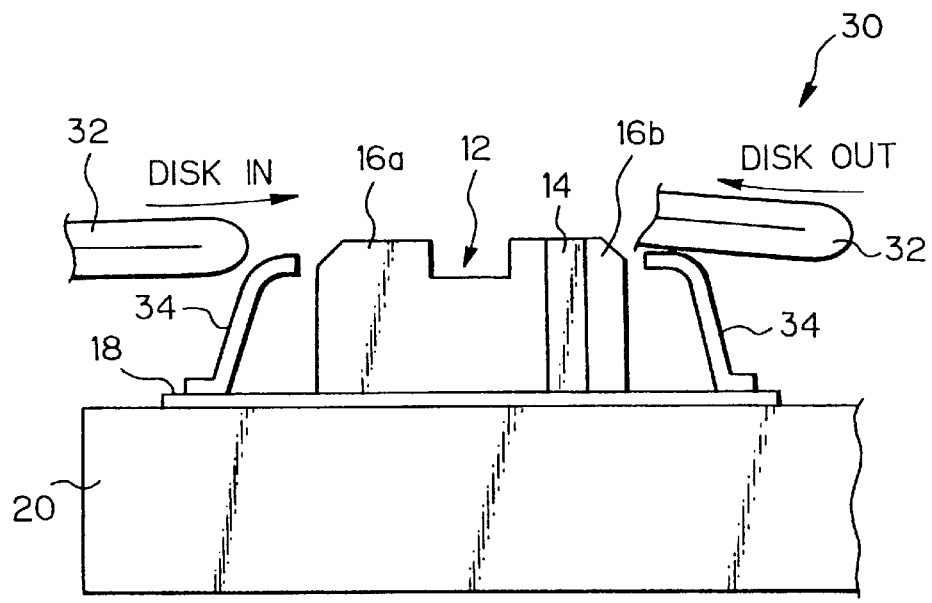

FIG. 2 shows another conventional head carriage assembly. As shown, the assembly, generally 30, has protector members 34 in addition to the slider 12 consisting of the core 14 and slider elements 16a and 16b, and metal plate 18. The protector members 34, made of metal or molding, have a generally spherical configuration and surround the slider 12. In this condition, the protector members 34 prevent a disk 32 from being caught by the slider 12 during loading or unloading. This assembly 30, therefore, needs at least four members, i.e., slider 12, metal plate 18, carriage 20, and protector members 34, also resulting in the problems stated previously.

Figure 3:
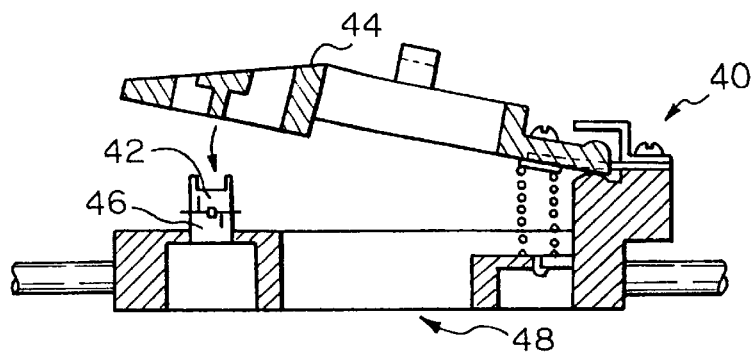
Figure 4:
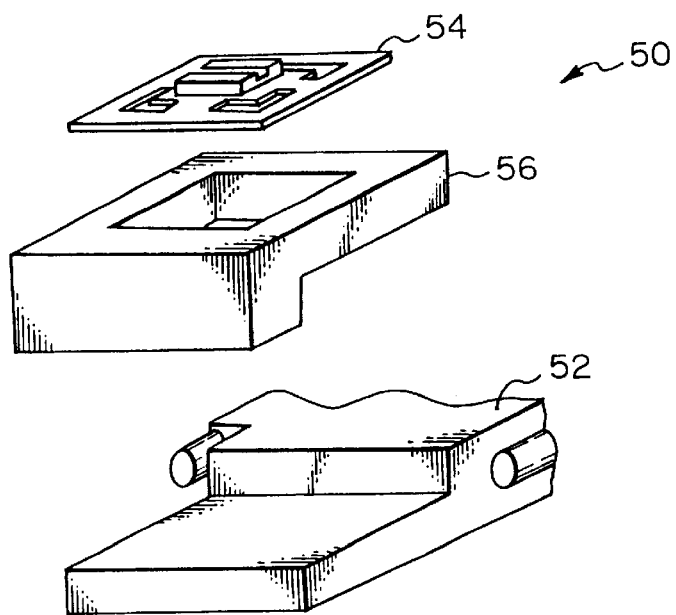
Figure 5:
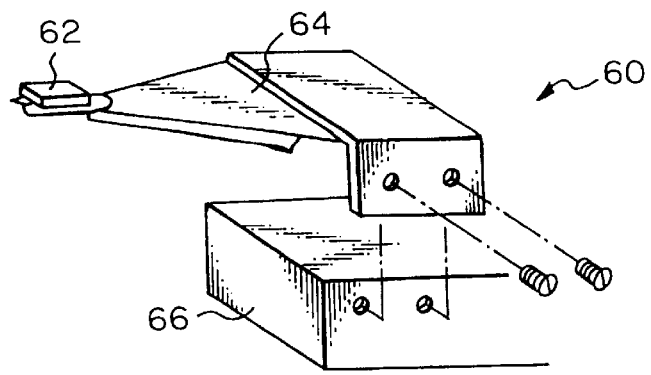

FIGS. 3–5 respectively show other conventional head carriage assemblies taught in Japanese Patent Laid-Open Publication Nos. 61-153868, 62-229579, and 4-278214. In FIG. 3, a head carriage assembly 40 has an arm 44 adhered to an upper head 42 which is positioned beforehand. The assembly 40 does not include a gimbal spring. However, the assembly 40 does not even suggest how a lower head 46 is affixed to a carriage 48. In FIG. 4, a head carriage assembly 50 has a carriage 52, a metal plate 54, and a member 56 intervening between the carriage 52 and plate 54. The member 56 is used to enhance the accurate positioning of a lower head. Further, in FIG. 5, a head carriage assembly 60 has a slider 62, a suspension 64 to which the slider 62 is affixed, and an arm 66 on which the integral slider 62 and suspension 64 are mounted.

All the head carriage assemblies 40–50 shown in FIGS. 3–5 also need at least three member and, therefore, also have the previously discussed problems.

Preferred embodiments of the head carriage assembly in accordance with the present invention will be described which are free from the problems stated earlier. In the embodiments, the same or similar constituents are designated by the same reference numerals.

Figure 6:
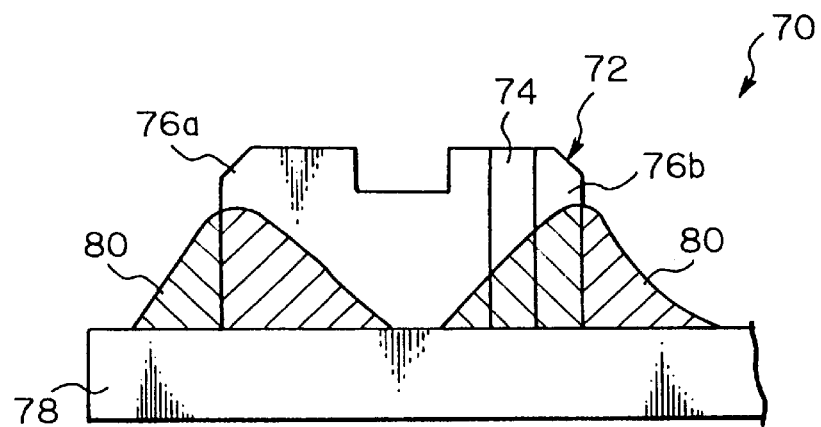
FIG. 6 is a side elevation of a head carriage assembly embodying the present invention.
Figure 7:
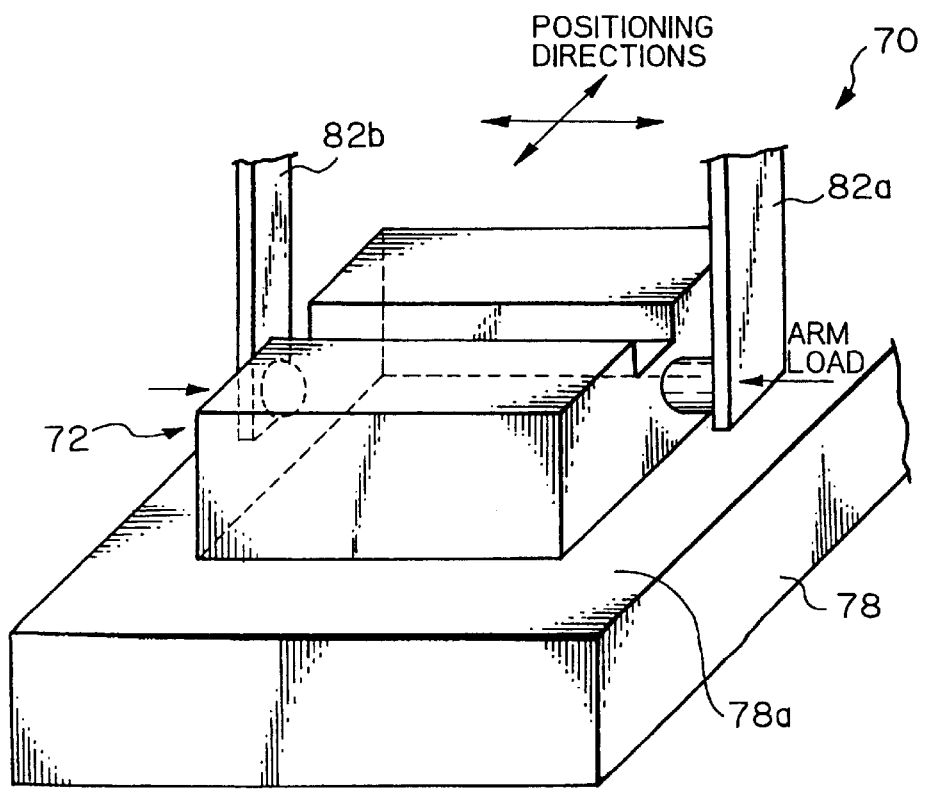
FIG. 7 is a perspective view demonstrating how the assembly shown in FIG. 6 is positioned.

Referring to FIG. 6, a head carriage assembly embodying the present invention will be described. As shown, the assembly, generally 70, has a slider 72 made up of a magnetic core 74 and a pair of slider elements 76a and 76b sandwiching the core 74, and a carriage 78 implemented by a molding. The slider 72 is affixed to the upper surface of the molding 78 by adhesive 80. As shown in FIG. 7, to position the assembly 70, the slider 72 is mounted to the upper surface of the carriage 78 and pressed by positioning arms 82a and 82b at opposite sides thereof. In this condition, the slider 72 is caused to slide in directions indicated by arrows in the figure, while having the R/W gap of the core 74 observed via a microscope, not shown.

Figure 8:
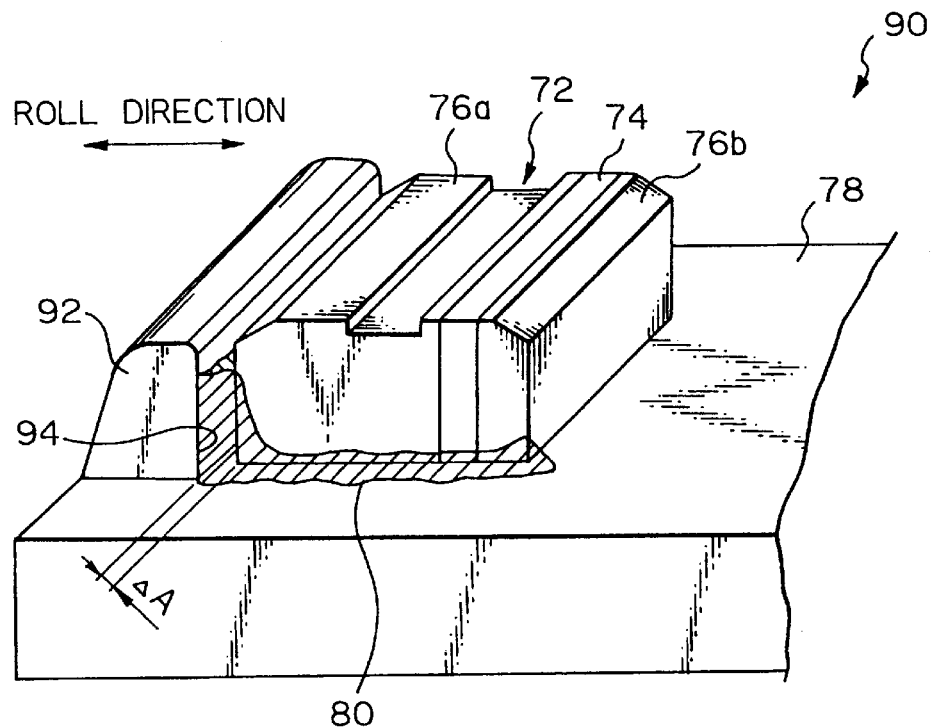
FIG. 8 is a perspective view of an alternative embodiment of the present invention.

FIG. 8 shows an alternative embodiment of the present invention. As shown, a head carriage assembly 90 includes a n implementation for increasing the adhesion strength of the slider 72 and carriage 78. Specifically, a projection 92 protrudes from the carriage or molding 78 at one side of the slider 72 and at the leading edge of the carriage 78 with respect to a rolling direction. It is to be noted that the rolling direction refers to a direction in which the assembly 90 is moved by a drive motor. The adhesive 80 also fills a gap 94 between the projection 92 and the slider 72. In this configuration, the carriage 78 and slider 72 are adhered to each other over a broader area and, therefore, by a greater strength.

The gap 94 is required to have a total dimension AA equal to or greater than I mm because a dimension of 0.2±0.1 mm is necessary for positioning the R/W gap of the core 74, and because a dimension of 0.2+0.5 mm to 0.2−0.1 mm is necessary when a shield ring, not shown, is positioned around the slider 72 as a measure against extraneous noise. Static electricity is generated when the slider 72 and a disk slide on each other. However, the static electricity can be released to ground if a ground pattern provided on a flexible printed circuit (FPC), not shown, is extended to the vicinity of the core 74 and if the ground pattern and core 74 are directly short-circuited by a conductive paint or the like.

Figure 9:
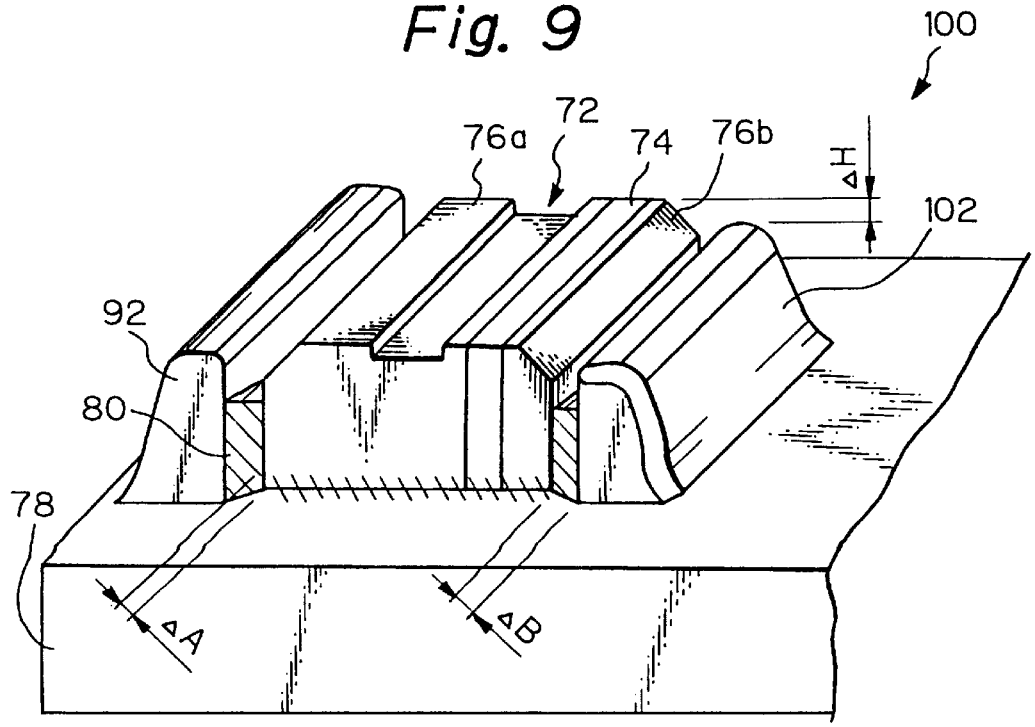
FIG. 9 is a perspective view of another alternative embodiment of the present invention.

Another alternative embodiment of the present invention is shown in FIG. 9. As shown, a head carriage assembly 100 is configured such that projections 92 and 102 protrude from the carriage 78 at opposite sides of the slider 72 with respect to the rolling direction. The function of the protector members 34, FIG. 2, may be assigned to the projections 92 and 102, if desired. Then, the slide surface of the slider 72 will be positioned at a level higher than the level of the projections 92 and 102 by ΔH which is about 0.2±0.1 mm. In FIG. 9, labeled ΔB is a dimension between the other end of the slider 72 and the projection 102.

In summary, it will be seen that the present invention provides an inexpensive head carriage assembly which needs a minimum of constituent parts and a minimum of assembling steps. This is because a slider included in the assembly is directly adhered to a carriage. Further, the absence of the conventional metal plate reduces the thickness of the assembly and, therefore, the overall thickness of a magnetic disk drive. In addition, the weight of the assembly is reduced in the front part of the carriage. This successfully reduces a period of time necessary for an overshoot and vibration occurring during seek due to a drive motor to attenuate, thereby reducing the reading time and writing time.

Various modifications will become possible for those skilled in the art after receiving the teachings of the present disclosure without departing from the scope thereof.

What is claimed is:

1. A sliding type head carriage assembly for a magnetic disk drive for flexible magnetic disks, comprising:

a slider including a magnetic core for writing and reading data to and from a flexible magnetic disk;

a carriage supporting said slider; and a projection protruding from said carriage at least in the vicinity of one side of said slider;

wherein said slider is directly adhered to said carriage by an adhesive, and wherein said projection is separate from and also directly adhered to said slider by said adhesive.

2. An assembly as claimed in claim 1, wherein a top of said projection is positioned 0.2±0.1 mm further away from said magnetic disk than a surface of said slider which contacts said magnetic disk.

3. A sliding type head carriage assembly for a magnetic disk drive for flexible magnetic disks, comprising:

a slider means, comprising a magnetic core, for sliding on a flexible magnetic disk and for writing data to and reading data from said flexible magnetic disk, said slider means having a contacting surface which contacts said magnetic disk, an opposite surface opposite said contacting surface, and four side surfaces;

a carriage means for supporting said slider means, said slider means being directly secured to said carriage means by adhesive disposed between said carriage means and said opposite surface; and two projection means protruding from said carriage means, for protecting said magnetic disk from being caught by the slider means during loading or unloading, and for further securing said slider means, said two projection means being disposed adjacent to, but separate from two parallel side surfaces of said slider means and securing said slider means by adhesive disposed between each of said two projection means and said slider means.

4. An assembly as claimed in claim 3, wherein tops of said projection means are positioned 0.2±0.1 mm further away from said magnetic disk than a surface of said slider means which contacts said magnetic disks.

* * * * *